(12) United States Patent
Marland et al.

(10) Patent No.: US 6,276,144 B1
(45) Date of Patent: Aug. 21, 2001

(54) CRYOGENIC THERMAL SWITCH EMPLOYING MATERIALS HAVING DIFFERING COEFFICIENTS OF THERMAL EXPANSION

(75) Inventors: Brian Marland, Ellicott City; Charles J. Stouffer, Kensington, both of MD (US)

(73) Assignee: Swales Aerospace, Beltsville, MD (US)

( * ) Notice: Subject to any disclaimer, the term of this patent is extended or adjusted under 35 U.S.C. 154(b) by 0 days.

(21) Appl. No.: 09/383,897

(22) Filed: Aug. 26, 1999

(51) Int. Cl.[7] .................................................. F25B 19/00
(52) U.S. Cl. ............................... 62/51.1; 62/383; 165/276
(58) Field of Search ...................... 62/51.1, 383; 165/276

(56) References Cited

U.S. PATENT DOCUMENTS

| | | | |
|---|---|---|---|
| 3,717,201 | * | 2/1973 | Hosmer et al. .................. 165/96 |
| 4,770,004 | * | 9/1988 | Logamos .......................... 62/383 |
| 5,535,815 | * | 7/1996 | Hyman ............................ 165/132 |
| 5,842,348 | * | 12/1998 | Kaneko et al. ................... 62/51.1 |

* cited by examiner

Primary Examiner—Ronald Capossela
(74) Attorney, Agent, or Firm—Roberts Abokhair & Mardula

(57) ABSTRACT

A cryogenic thermal switch operates based on the principle of differential coefficients of thermal expansion of differing materials. A small gap is either closed or opened, dependant upon the relative dimensions of two pieces of differing materials. As the temperature of the pieces is raised, the piece having the greater coefficient of thermal expansion ($C_{TE}$) increases its dimensions at a greater rate, causing a gap to open up. Conversely, when the temperature of the pieces is lowered, the piece having the greater $C_{TE}$ shrinks proportionally faster, thereby closing the gap. The present invention makes use of a reliable flat-faced geometry for the two sides of the gap.

10 Claims, 3 Drawing Sheets

CRYOGENIC THERMAL SWITCH EMPLOYING MATERIALS HAVING DIFFERING COEFFICIENTS OF THERMAL EXPANSION

This invention was made with Government support under contract No. F29601-95-C-0211 awarded by the Department of the Air Force. The Government has certain rights in the invention.

BACKGROUND OF THE INVENTION

1. Field of the Invention

The present invention is directed to a thermal switch. More particularly, the present invention is directed to a device for alternately switching, on command, between having a high thermal conductivity and a low thermal conductivity.

2. Background Information

A thermal switch is a device for selectively conducting heat energy. In its on state, a thermal switch readily conducts heat energy. When switched into an off state, the thermal switch is a very poor conductor of heat energy. An ideal thermal switch has an infinite thermal conductivity in the ON state and a zero conductivity in the OFF state.

In cryogenic applications (e.g., below 60K), a suitable thermal switch does not exist in the prior art. An acceptable on-off ratio (ratio of ON state thermal conductance to OFF state thermal conductance) for cryogenic applications would be 1000:1. No prior art cryogenic thermal switch meets this criterion.

Referring to FIG. 1, a gas gap thermal switch is illustrated in cross-section. In this thermal switch, the hot side element 101 is in thermal contact with a heat source (not shown). The hot side element 101 is separated from cold side element 103 by a gap 105. The gap 105 is the space formed between the frustoconical member 106 projecting from the hot side element 101 and the frustoconical cavity 104 in the cold side element 103. A hermetically sealed container 107 surrounds the gap 105 and is used to selectively contain a thermally conductive gas.

When it is desired for the gas gap thermal switch to conduct in the ON state, the thermally conductive gas is placed inside 109 the hermetically sealed container 107 via the gas supply shown. When the thermally conductive gas is placed inside the hermetically sealed container 107, heat energy is allowed to migrate from the hot side element 101, across the gap 105 by means of the thermally conductive gas, to the cold side element 103. When it is desired to switch the gas gap thermal switch to the OFF state, the thermally conductive gas is evacuated from the hermetically sealed chamber 107, leaving a vacuum inside the void 109 and the gap 105. When chamber 107 is evacuated, only a very reduced amount of heat energy is transmitted from the hot side 101 to the cold side 103 and conducted away by the cryocooler (not shown).

The gas gap thermal switch of the prior art has two major disadvantages. One is that it is a very complex device (because of the necessary gas handling structures and control system therefor, not shown) and, thus, is prone to failure. It requires a perfect hermetic seal in which the thermally conductive gas is contained. If the seal fails, then the switch will not properly work in an ON condition. Another disadvantage is the critical alignment required that cannot be verified after integration.

A failed attempt has been made to construct a thermal switch based on the principle of differential coefficients of thermal expansion, using the geometry of the gas gap switch shown in FIG. 1. According to this prior art attempt, the hot side member 101 and the cold side member 103 are constructed of different materials which have different coefficients of thermal expansion, $C_{TE}$. The hot side member 101 is chosen to have a coefficient of thermal expansion which is much smaller than the coefficient of thermal expansion of the material used for the cold side member 103. As the temperature of the switch elements 103 and 101 rise, the dimensions of the cold side element 103 would expand at a faster rate than the dimensions of the hot side element 101. Thus, as temperature rises, a gap would open up between 103 and 101. This would cause the transition of the switch from the ON state to the OFF state. In order to reverse the state from OFF back to ON, the cold side 103 would need to be cooled down, thereby shrinking its dimensions so as to come into contact with the hot side element 101.

The reason that this prior art attempt at a differential coefficient of thermal expansion type of thermal switch failed is because it is impossible to solve the problem of being able to make the surfaces of the two elements 101 and 103 meet together in a good thermal conducting relationship with good contact on a reliable basis. The problem goes beyond merely the challenges of how to machine and polish the surface of the frustoconical member 106 to sufficiently match the shape of the surface of the frustoconical cavity 104. The primary problem is how to align the member 106 and the cavity 104 so that they reliably contact one another so as to produce positive engagement across substantially all of their opposed surface area. The smallest misalignment results in only point contacts at a few places, which is unacceptable because such minimal contact points produce very poor thermal conductivity for the ON state. Because of this mechanical mismatch of the surfaces, the two surfaces cannot reliably mate to one another and provide a reliable ON state. In addition, the proper alignment of the frustoconical member 106 and frustoconical cavity 104 is not easily verified when the switch is assembled. Consequently, the gap 105 is difficult to maintain and the switch does not work properly in the OFF condition.

Accordingly, what is needed is a cryogenic thermal switch that provides an adequate on-off ratio and a reliable ON state conductance. What is also needed is a cryogenic thermal switch which has a simple construction and which operates reliably.

SUMMARY OF THE INVENTION

It is an object of the present invention to provide a thermal switch that solves the above-noted problems of the prior art.

It is a further object of the present invention to provide a thermal switch that operates reliably at cryogenic temperatures.

It is another object of the present invention to provide a thermal switch that operates with a high on-off ratio.

It is yet another object of the present invention to provide a thermal switch that operates based on differential coefficients of thermal expansion of materials.

It is still another object of the present invention to provide a thermal switch that operates with high reliability.

To achieve the above objects of the invention, the inventor has discovered a mechanical geometry and combination of elements for exploiting the differences in coefficients of thermal expansion of materials so as to construct a thermal switch which operates reliably and effectively at cryogenic temperatures.

To achieve the above objects, a thermal switch is provided for modulating heat conductance between a thermal load and a cooling element. The thermal switch has a hot side contact (in thermal communication with the thermal load), a cold side contact (in thermal communication with the cooling element), and a differential expansion member. The differential expansion member is disposed inside the hot side contact and is connected at a first end to the hot side contact and at a second end connected to the cold side contact.

It is important to note that this invention provides for an on-off ratio on the order of 1000:1.

BRIEF DESCRIPTION OF THE DRAWINGS

Other objects and advantages of the present invention will be evident in the following detailed description of a preferred embodiment of the present invention read in light of the attached drawing figures.

DETAILED DESCRIPTION OF THE INVENTION

Figure 1:
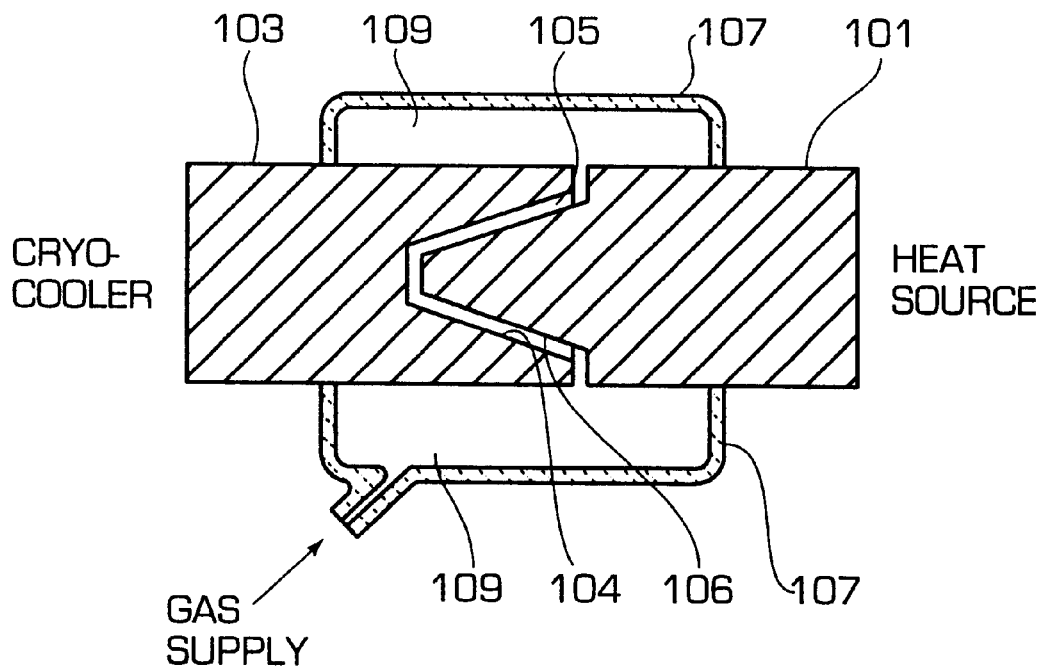
FIG. 1 illustrates a gas gap thermal switch according to the prior art.
Figure 2:
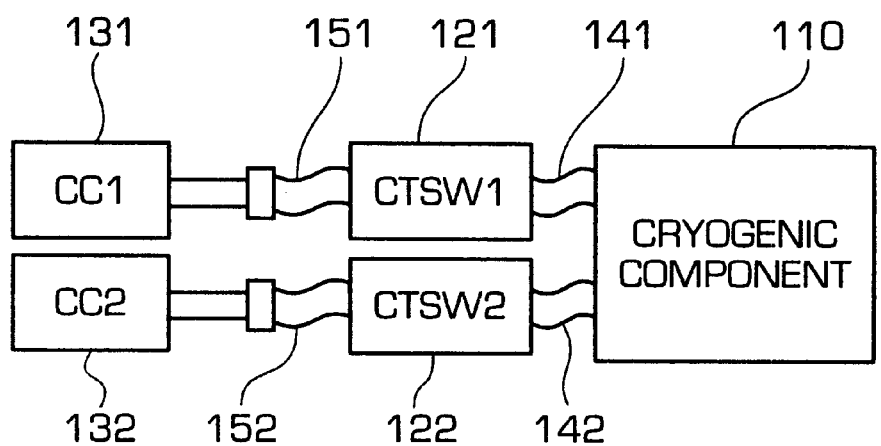
FIG. 2 illustrates a generalized configuration where cryogenic thermal switches are typically used.

Referring to FIG. 2, a heat transfer system for a cryogenic component 110 is illustrated. This is a generalized system, which may be found in the prior art. The present invention would differ from the prior art in the particular type of thermal switches used as CTSW1 or CTSW2. The cryogenic component 110 symbolizes any general device that needs to be maintained at a very low, i.e., cryogenic, temperature. An example of such a device is a sensor or instrument mounted aboard a spacecraft.

Cooling of the cryogenic component 110 is effected by redundant cryocoolers CC1 (131) and CC2 (132). Although the cooling may be performed by the redundant cryocoolers CC1 and CC2 operating simultaneously, typically only one of the cryocoolers, say CC1, is operated leaving the other cryocooler CC2 dormant. In the event that the initially operating cryocooler CC1 fails, then it would be appropriate to activate dormant cryocooler CC2 as a backup. This redundant configuration is based on the principal of "graceful degradation" wherein the system is intended to be able to cope with the failure of an important component. In this case, the system is intended to continue operation despite the failure of a cryocooler.

Because of the preference of spacecraft operator to use only one cryocooler at a time while leaving the redundant cryocooler in a non-operating state, it becomes important to have thermal switches. That is because the cooling load on the operating cryocooler is increased because the non-operating cryocooler contributes an unwanted parasitic heat load. A cryogenic thermal switch can minimize this parasitic penalty. For example, when the cryogenic component is initially deployed, the first cryocooler (CC1) 131 is turned on to provide cooling and the second cryocooler (CC2) 132 is left in a non-operating state. The first cryogenic thermal switch (CTSW1) 121 is placed in an ON condition and the second cryogenic thermal switch (CTSW2) 122 is placed in an OFF condition. Heat energy flows from the cryogenic component 110 via a flexible braid 141, through CTSW1, via a flexible braid 151, and into the first cryocooler 131. Because CTSW2 is in an off state, the cryogenic component 110 is thermally isolated from the non-operating cryocooler CC2 and, thus, minimizes the parasitic penalty due to the non-operating cryocooler CC2.

In the event the operator of the spacecraft chooses to deactivate the first cryocooler CC1 in favor of the second cryocooler CC2, the second cryogenic thermal switch 122 is switched into an ON condition and the first cryogenic thermal switch 121 is switched into an OFF condition. Thus, conversely to the situation described in the previous paragraph, heat energy flows out of the cryogenic component, through cable braid 142, through CTSW2, through cable braid 152, and out to the second cryocooler 132. The heat energy that flows between the first cryocooler 131 and the cryogenic component 110 is minimized because of the thermal isolation provided by CTSW1 being in an OFF state.

As explained above, prior art cryogenic thermal switches are not very effective or reliable. The on-off ratio provided by the prior art gas gap and conical thermal expansion cryogenic thermal switches is not sufficiently large so as to provide effective thermal isolation in an OFF state and good thermal conduction in an ON state. Good thermal isolation in the OFF state is important to prevent the parasitic loading effects of the non-operating redundant cryocooler. Conversely, a good ON state conductance is important so that the thermal switch does not develop an excessive temperature drop, thereby raising the temperature of the cryogenic component unnecessarily. The relevant temperature range for many cryogenic components used in spacecraft is in the range of 30K to 100K. At such extremely low temperatures, an excessive temperature drop induced into the system by excessive thermal resistance can cause the operating temperature of the cryogenic component to be unacceptable.

In this context, the present invention provides a cryogenic thermal switch based on the principle of differential coefficients of thermal expansion of differing materials. The basic underlying principle of the cryogenic thermal switch of the present invention is that a small gap is either closed or opened, dependant upon the relative dimensions of two pieces of different materials. As the temperature of the pieces is raised, the piece having the greater coefficient of thermal expansion increases its dimensions at a greater rate, causing a gap to open up. Conversely, when the temperature of the pieces is lowered, the piece having the greater coefficient of thermal expansion shrinks proportionally faster, thereby closing the gap. The present invention makes use of a reliable flat-faced geometry for the two sides of the gap.

Figure 3:
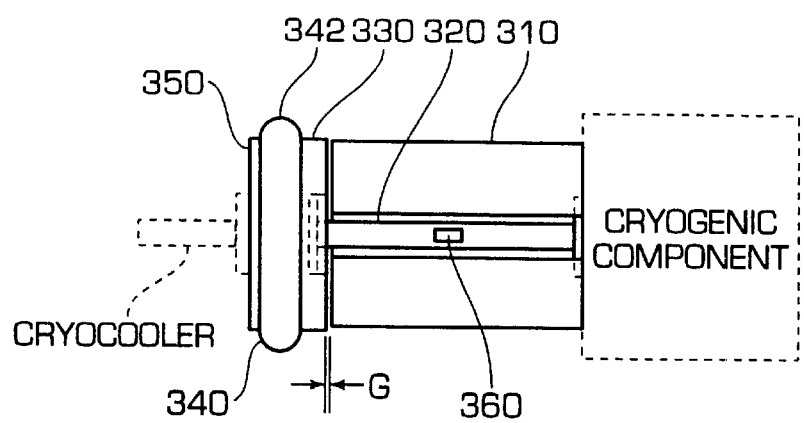
FIG. 3 shows a plan view of an embodiment of the cryogenic thermal switch according to the present invention, with conventional structures shown in phantom.

Referring to FIG. 3, a preferred embodiment of the cryogenic thermal switch according to the present invention is illustrated. The hot side contact 310 is in thermal communication with the cryogenic component (shown in phantom at the right of the figure). A differential expansion member 320 extends through the hot side contact 310 from the interface with the cryogenic component all the way down to a connection with the cold side component 330. As illustrated, the thermal switch is in the OFF state, with a small gap G being portrayed between the hot side contact 310 and the cold side contact 330. The gap G need not be very large (typically 0.002 inches) in order to effectively destroy thermal conductivity between the hot side contact 310 and the cold side contact 330. To transfer heat energy from the cold side contact 330 to the cryocooler (portrayed in phantom at the left side of the figure), flexible braids 340, 342 are provided to give thermal conduction between the cold side contact 330 to the cryocooler via a cryocooler mounting plate 350.

Although not necessary for operation of the thermal switch, an advantageous additional element is a small electric heater 360 mounted in the middle of the differential expansion member 320. The heater 360 is usefull for the purpose of speeding up the ON-to-OFF transition of the thermal switch by heating up the differential expansion member and thereby opening the gap in an accelerated manner.

In the ON state, the gap G is closed and hot side contact 310 is in firm thermal contact with cold side contact 330. The hot side contact 310 and the cold side contact 330 are intentionally configured to have relatively large cross-sectional areas so as to provide very low thermal resistance, particularly at the very large contact area therebetween. Some small, negligible amount of heat energy also flows from the cryogenic component, through the differential expansion member 320, to its connection at the cold side contact 330.

In the OFF state, as mentioned above, the gap G created by the differential thermal expansion of the differential expansion member 320 effectively separates the hot side contact 310 from the cold side contact 330 so as to entirely defeat thermal conductivity via the hot side contact 310. Some small, negligible amount of heat energy may still flow via the differential expansion member 320, since its ends remain connected to the cryogenic to component and the cold side contact 330. However, the geometry of the differential expansion member is carefully selected so as to minimize its thermal conductivity properties. Preferably, it is embodied as a very thin-walled tube having a relatively small cross-sectional area, thereby presenting high thermal resistance.

It is preferred to form the hot side contact 310 and the cold side contact 330 out of beryllium metal. Alternately, these components may be formed of any material with a similarly low $C_{TE}$. Beryllium is preferred for a number of reasons. Beryllium has a low $C_{TE}$ and it is very stable at cryogenic temperatures. In the case where the cryogenic component to be cooled is formed of beryllium, it is particularly advantageous to form the hot side contact 310 of beryllium. By matching materials, the beryllium hot side contact 310 can be directly coupled to the beryllium cryogenic component. This eliminates the need for the flexible braids 141, 142 (refer to prior art FIG. 2) which are employed in prior art configurations for strain relief. In the prior art, the hot side contact is commonly formed of copper or Al 1100. As these metals have very different $C_{TE}$ from the material the cryogenic component is formed of (beryllium) they cannot be directly attached to the cryogenic component. That is because when two metals with substantially different $C_{TE}$ are connected together, there is a substantial likelihood that warping will occur due to bending moments induced at the interface of the dissimilar materials as temperature changes. Such warping is unacceptable when the cryogenic component is an imaging device because warping of the imaging device would cause the image it produces to be distorted.

Making the external interfaces of the thermal switch of beryllium is out of step with the prior art. Because of the dangers and inconveniences that accompany beryllium fabrication, the prior art practice is to avoid its use, when possible, in favor of more convenient materials such as copper, aluminum, and stainless steel. By using beryllium, however, the present invention avoids certain flexible braid structures that are necessary in the prior art, thereby simplifying the system.

The differential expansion member is selected so as to have a much greater coefficient of thermal expansion than that of beryllium. A suitable material for the differential expansion member is a thin-walled stainless steel tube.

The flexible braids 340, 342 and the cryocooler mounting plate 350 may be advantageously formed of any compatible material having a low thermal resistance, such as copper. The flexible braids 340, 342 are used to couple the cryocooler mounting plate 350 to the cold side contact 330 primarily to isolate the switch and the cryogenic component from vibrations generated by the cryocooler. Additionally, it is important to avoid distortion (due to possible warping due to $C_{TE}$ mismatches) of the cold head of the cryocooler. Distortion of the cold head may result in substantial decreases in the efficiency of the cryocooler.

Figure 4:
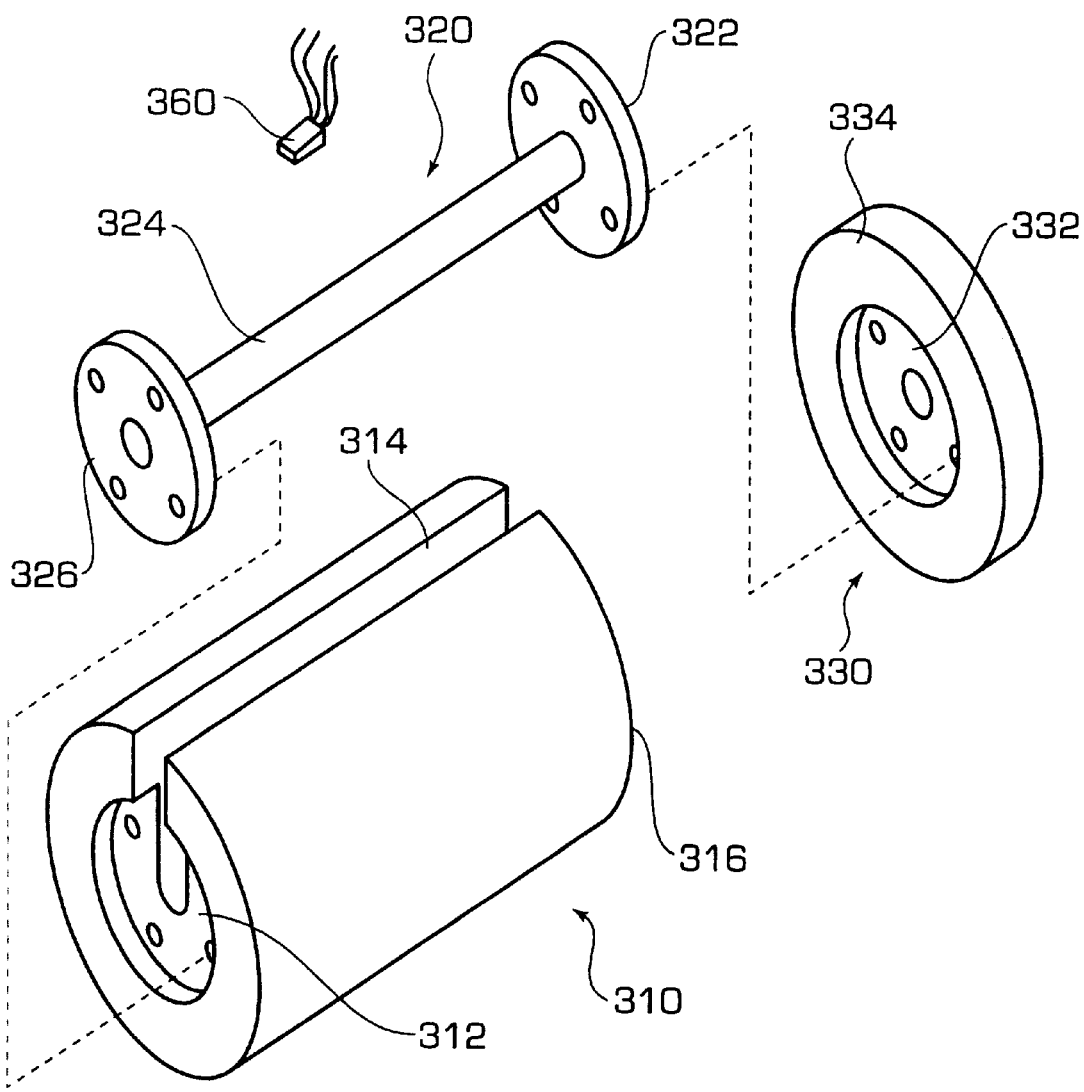
FIG. 4 shows an exploded view of an embodiment of the cryogenic thermal switch according to the present invention.

Referring to FIG. 4, an exploded view of the main operating parts of a cryogenic thermal switch according to the present invention is illustrated. The hot side contact 310 is generally cylindrical in shape with a channel 314 running its entire length. A counterbore 312 is centered in the face of the hot side contact 310 that is to be placed in thermal contact with the cryogenic component to be cooled. The counterbore 312 is sized to accommodate the hot end flange 326 of the differential expansion member 320. When the hot end flange 326 of the differential expansion member 320 is fitted into the counterbore 312 of the hot side contact 310, the tubular portion 324 of the differential expansion member 320 is disposed in the channel 314. It is important that the parts be aligned so that the tubular portion 324 does not contact the sides of the channel 314. The tubular portion 324 is connected at one end to the hot side flange 326 and at its other end is connected to cold side flange 322. The cold side contact 330 has a centered counterbore 332, which is sized to accommodate the cold end flange 322 of the differential expansion member 320.

When the hot side flange 326 is fitted into its respective counterbore 312, and when the cold side flange 322 is fitted into its respective counterbore 332, then the flat contact face 334 of the cold side contact 330 is brought into opposition with the flat contact face 316 of the hot side contact 310. The hot side flange 326 and cold side flange 322 are secured in their respective counterbores 312, 332 via threaded fasteners (not shown). Care should be taken to align the opposed flat contact faces 316, 334 so that they are parallel to one another. This fine alignment is done by using shims or by selective machining at the interfaces of the flanges 322, 326 to their respective counterbores 332, 312.

The heater 360 is disposed directly on the tubular portion 324 of the differential expansion member 320. This contact may be secured by any conventional means appropriate for the environment in which the thermal switch is to be deployed.

A working example of a cryogenic thermal switch according to the present invention is described as follows. The hot side contact 310 and cold side contact 330 components are formed of beryllium metal, and the differential expansion member 320 is formed of stainless steel. The measured conductance of the thermal switch in the ON state is 0.25 to 0.5 W/K. The contact force urging the cold side contact into contact with the hot side contact is approximately 100 lbf in the ON state. The apparent thermal resistance of the thermal switch in the OFF state is 1500 to 2500 K/W.

The transition time for switching from the ON state to the OFF state is less than 1 minute when a heater 360 is employed to warm up the differential expansion member. Once the cryocooler has warmed up (i.e., is deactivated or fails), it is not necessary to maintain the heater 360 energized in order to maintain the thermal switch in the OFF state. The speed at which a transition from the OFF state to the ON state can be accomplished is limited only by the cool down rate possible by the cryocooler.

A thermal switch according to the present invention is optionally embodied having softened contact faces. In other words, rather than the two flat opposed contact faces 316, 334 mating to form a direct beryllium-to-beryllium contact, one or both of the faces may be modified to increase the ON state conductance. This is done by plating one or both of the opposed flat faces with gold, silver, indium or other plating materials. Alternatively, this is done by coating both faces with graphite felt or other micro materials that mesh to increase the conductance.

The operating range of temperatures for the thermal switch has been determined to be from 300K to less than 4K.

Figure 5:
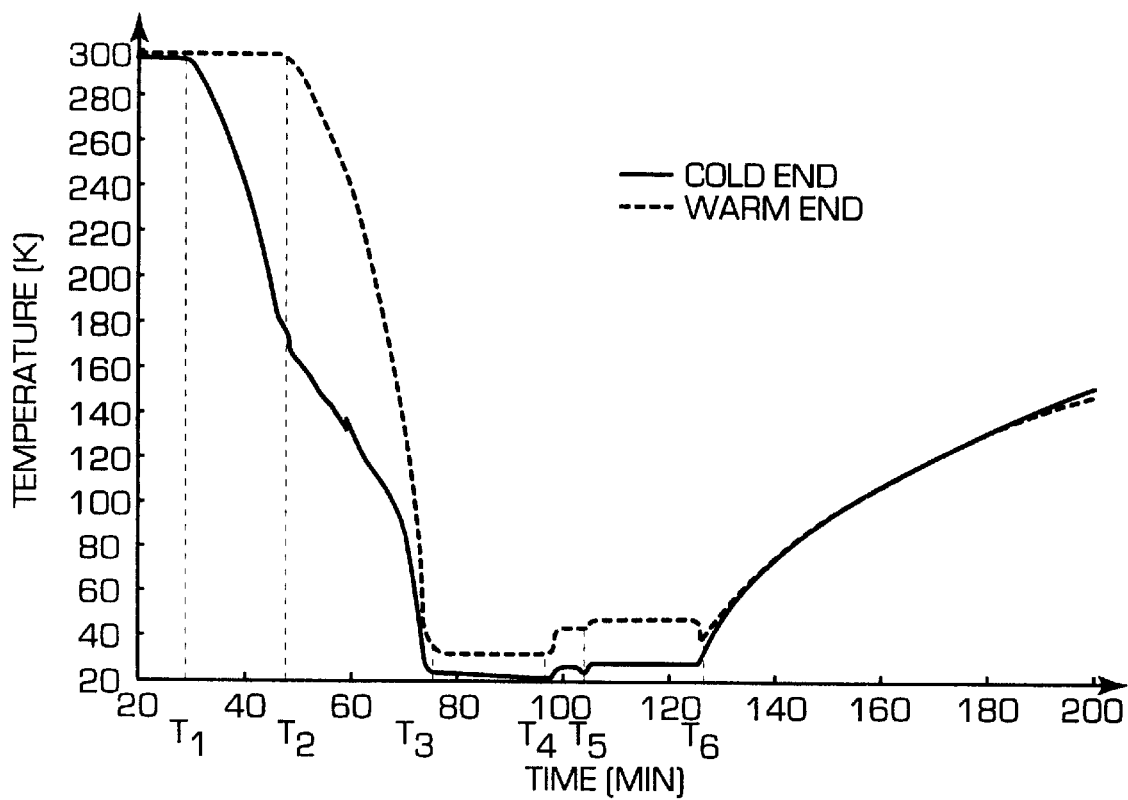
FIG. 5 illustrates test data of temperature versus time for a working example of a cryogenic thermal switch according to the present invention.

FIG. 5 illustrates test data for a working example of the thermal switch according to the present invention. The solid line plots temperature readings from a temperature sensor mounted on the cold end of the switch (i.e., mounted on the cold side contact 330), and the broken line plots temperature readings from a temperature sensor mounted on the warm end of the switch (i.e., mounted on the hot side contact 310 near the cryogenic component).

Prior to time $T_1$, the entire system is at about room temperature (near 300K). At time $T_1$, the cryocooler is turned on and there is negligible heat load at the warm end. Accordingly, the warm end maintains a relatively steady temperature at around 300K, whereas the cold end begins to drop in temperature precipitously. At time $T_2$, the thermal switch turns on by transitioning from the OFF state to the ON state. This is a result of the fact that the differential expansion member has cooled sufficiently to close the gap, thereby bringing the hot side contact into thermal contact with the cold side contact. As a result, the temperature of the warm end begins to drop precipitously, and the slope of the temperature drop on the cold end eases slightly.

At time $T_3$, the system reaches thermal equilibrium with the thermal switch in the ON state, the cryocooler operating, and a 3 W heat load at the cryogenic component. At a 3 W thermal load, there is approximately a 10K temperature drop across the cryogenic thermal switch. The ON state thermal conductance of the switch is the 0.3 W/K.

At time $T_4$, the cryogenic component loads the system with a heat load of 4 W. The temperature of both the warm end and cold end rise slightly and the thermal conductance of the switch in the ON state holds steady at 0.3 W/K.

At time $T_5$, the heat load due to the cryogenic component is increased to 5 W. Once again, the temperature of both the warm end and cold end rise slightly, but the thermal conductance of the cryogenic thermal switch in its ON state remains steady at 0.3 W/K. At this thermal load, the temperature on the warm end, at the cryogenic component, is maintained below 50K. At time $T_6$, the cryocooler is switched to a non-operational state with the cryogenic thermal switch remaining in an ON state. The warm end and cold end temperatures approach one another as there is no longer an appreciable temperature drop across the thermal switch. The temperature readings at both ends of the thermal switch rise together gradually as the whole system warms up.

This test demonstrates the very high thermal conductance of the switch in its ON by state as evidenced by the rapid convergence of temperatures after $T_2$ and the low temperature drop of the thermal switch under thermal load (from $T_3$ to $T_6$). This test also demonstrates the effective thermal isolation between the hot end and cold end in the OFF state of the switch (between times $T_1$ and $T_2$).

The present invention has been described above in terms of a preferred embodiment and a working example, however, persons of ordinary skill in the art will appreciate that various modifications and improvements may be made to the invention as described without departing from the scope of the described invention. The scope of the invention is limited only by the appended claims.

What is claimed is:

1. A thermal switch for modulating heat conductance between a thermal load and a cooling element, the thermal switch comprising:
    a hot side contact, in thermal communication with the thermal load;
    a cold side contact, in thermal communication with the cooling element; and
    a differential expansion member disposed inside the hot side contact and being connected at a first end to the hot side contact and at a second end connected to the cold side contact.

2. The thermal switch of claim 1, wherein the hot side contact and the cold side contact each have a first coefficient of thermal expansion, $C_{TE1}$, and the differential expansion member has a second coefficient of thermal expansion, $C_{TE2}$, and wherein $C_{TE1}$ is smaller than $C_{TE2}$.

3. The thermal switch of claim 1, wherein the thermal conductivity of the hot side contact is larger than the thermal conductivity of the differential expansion member, and wherein the thermal conductivity of the cold side contact is larger than the thermal conductivity of the differential expansion member.

4. The thermal switch of claim 1, wherein the hot side contact has a first flat contact face and the cold side contact has a second flat contact face, the first and second flat contact faces being disposed parallel to one another.

5. The thermal switch of claim 4, wherein said first and second flat contact faces are in contact with one another when the switch is in an ON state, and wherein said first and second flat contact faces are separated by a gap when the switch is in an OFF state.

6. The thermal switch of claim 5, wherein the thermal switch has a first thermal conductance when the thermal switch is in the ON state and has a second thermal conductance when the thermal switch is in the OFF state, the ratio of the first thermal conductance to the second thermal conductance is about $10^3$.

7. The thermal switch of claim 4, wherein said first and second flat contact faces are each plated with a layer of gold.

8. The thermal switch of claim 4, wherein said first and second flat contact faces are each coated with graphite felt.

9. The thermal switch of claim 1, wherein the hot side contact and the cold side contact each comprise beryllium.

10. A thermal switch for modulating heat conductance between a thermal load and a cooling element, the thermal switch comprising:
    a hot side contact, having a first flat contact face, and being in thermal communication with the thermal load;
    a cold side contact, having a second flat contact face, and the cold side contact being in thermal communication with the cooling element, the first and second flat contact faces being disposed parallel to one another; and a differential expansion member disposed inside the hot side contact and being connected at a first end to the hot side contact and at a second end connected to the cold side contact;

wherein said first and second flat contact faces are in contact with one another when the switch is in an ON state;

wherein said first and second flat contact faces are separated by a gap when the switch is in an OFF state;

wherein the hot side contact and the cold side contact each have a first coefficient of thermal expansion, $C_{TE1}$, and the differential expansion member has a second coefficient of thermal expansion, $C_{TE2}$, $C_{TE1}$ being smaller than $C_{TE2}$;

wherein the thermal conductivity of the hot side contact is larger than the thermal conductivity of the differential expansion member; and wherein the thermal conductivity of the cold side contact is larger than the thermal conductivity of the differential expansion member.

* * * * *

UNITED STATES PATENT AND TRADEMARK OFFICE
CERTIFICATE OF CORRECTION

PATENT NO. : 6,276,144 B1  Page 1 of 1
APPLICATION NO. : 09/383897
DATED : August 21, 2001
INVENTOR(S) : Brian Marland and Charles J. Stouffer It is certified that error appears in the above-identified patent and that said Letters Patent is hereby corrected as shown below:

COLUMN 5, LINE 9, change "usefull" to --useful--
COLUMN 6, LINE 36, after "and" and before "its" delete "at"
COLUMN 8, LINE 2, after "ON" delete "by"

Signed and Sealed this

Twentieth Day of January, 2009

JON W. DUDAS
*Director of the United States Patent and Trademark Office*